United States Patent
Ohta et al.

(10) Patent No.: US 6,399,752 B1
(45) Date of Patent: Jun. 4, 2002

(54) POLYAZO COMPOUND OR SALT THEREOF AND DYE-BASED POLARIZATION FILM CONTAINING THE SAME

(75) Inventors: Yoshiteru Ohta, Nara; Narutoshi Hayashi, Niihama; Toru Ashida, Toyonaka, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/990,374

(22) Filed: Nov. 23, 2001

(30) Foreign Application Priority Data

| Nov. 27, 2000 | (JP) | 2000-359020 |
| Jan. 10, 2001 | (JP) | 2001-002360 |
| Aug. 27, 2001 | (JP) | 2001-255807 |
| Aug. 27, 2001 | (JP) | 2001-255808 |
| Aug. 30, 2001 | (JP) | 2001-261128 |

(51) Int. Cl.$^7$ .......... C09B 31/072; C09B 31/20; C09B 31/30; C09B 33/26; G02B 5/30
(52) U.S. Cl. .......... 534/806; 534/811; 534/812; 534/819; 534/669; 252/585; 359/491
(58) Field of Search .......... 534/806, 811, 534/812, 819, 669; 252/585; 359/491

(56) References Cited

U.S. PATENT DOCUMENTS 5,446,135 A * 8/1995 Misawa et al. .......... 534/714
5,659,020 A * 8/1997 Ogino et al. .......... 534/678
5,700,296 A * 12/1997 Ogino et al. .......... 8/489

FOREIGN PATENT DOCUMENTS

JP 09302250 A 11/1997
JP 2001033627 A 2/2001

* cited by examiner

Primary Examiner—Fiona T. Powers
(74) Attorney, Agent, or Firm—Birch, Stewart, Kolasch & Birch, LLP

(57) ABSTRACT

A polyazo compound or salt thereof of the following formula (I):

$$A-B-\underset{R^1}{\overset{R^2}{\bigcirc}}-N=N-\underset{R^3}{\overset{R^4}{\bigcirc}}-N=N-(\underset{R^5}{\overset{R^6}{\bigcirc}}-N=N)_n-\underset{HO_3S}{\overset{OH}{\bigcirc}}-D-E$$

wherein,

A represents a naphthyl having 1 to 3 sulfos or a phenyl having 1 to 2 hydrophilic groups selected from sulfo and carboxyl and optionally having a lower alkyl or lower alkoxy, B represents —NHCO— or —N=N—, n represents 0 or 1, $R^1$ to $R^6$ represent hydrogen, lower alkyl or lower alkoxy, $R^7$ represents hydrogen or sulfo, D represents —N=N— when B is —N=N— and represents —NHCO—, —N=N— or —NH— when E is —NHCO—, and E represents a phenyl optionally having 1 to 3 groups selected from hydroxyl, amino, nitro, sulfo, carboxyl, lower alkyl and lower alkoxy; and a dye-based polarization film which manifests high polarization ability, is excellent in durability and light resistant to exposure for a long period of time and is obtainable by adding the above polyazo compound or salt thereof; are provided.

11 Claims, No Drawings

POLYAZO COMPOUND OR SALT THEREOF AND DYE-BASED POLARIZATION FILM CONTAINING THE SAME

BACKGROUND OF THE INVENTION

The present invention relates to a polyazo compound or a salt thereof, and a dye-based polarization film containing the same.

Polarization films are produced by adding iodine and dichromatic dye as a polarization element into a polarization film substrate such as a drawn and oriented polyvinyl alcohol-based film, an oriented polyene-based film produced by de-hydrochloric acid of a polyvinyl chloride film or dehydration of a polyvinyl alcohol film, and the like. Among them, iodine-based polarization films manifest a problem of decrease in abilities thereof under high temperature and high humidity conditions, since they have poor endurance to heat and poor endurance to water though they are excellent in the initial polarization ability. Some methods are studied for enhancing such endurances, such as a method in which treatment is effected with an aqueous solution containing formaldehyde or boric acid, a method In which a polymer film having low water vapor permeability is used as a protective film, and the like,. However, these methods are not sufficient yet.

On the other hand, dye-based polarization films using a dichromatic dye as a polarization element generally poor In initial polarization ability though they art excellent in endurance to heat and water as compared with iodine-based polarization films. Therefore, there is a desire for polyazo dyes used in a polarization film excellent in the initial polarization ability.

The present inventors have investigated dyes which have excellent dyeing property in producing a polarization film, are excellent in polarization ability. durability under high temperature and high humidity conditions and light resistance, and cover a region of from 500 to 580 nm in a polarization film used for a liquid crystal projector and the like, the polarization film being obtained by orientation and adsorption of a dichromatic dye in a polymer film, Resultantly, they have found that a specific polyazo compound or salt thereof attains the above-mentioned object. Thus, the present invention was completed.

SUMMARY OF THE INVENTION

Namely, the present Invention provides a polyazo compound or salt thereof of the following formula (I):

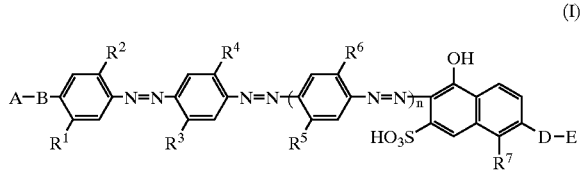

(I)

wherein,

A represents a naphthyl having 1 to 3 sulfos or a phenyl having 1 to 2 hydrophilic groups selected from sulfo and carboxyl and optionally having a lower alkyl or lower alkoxy, B represents —NHCO— or —N=N—, n represents 0 or 1, provided that, when B represents —N=N—, n represents or $R^1$ to $R^6$ are the same or different and represent hydrogen, lower alkyl or lower alkoxy, provided that, when n represents 0, $R^1$ to $R^4$ represent hydrogen or lower alkyl, $R^7$ represents hydrogen or sulfo, D represents —N=N— when B is —N=N— and represents —NHCO—, —N=N— or —NH— when B is —NHCO—, and E represents a phenyl optionally having 1 to 3 groups selected from hydroxyl amino, nitro, sulfo, carboxyl, lower alkyl and lower alkoxy.

The present invention further provides a dye-based polarization film obtainable by adding the above-mentioned polyazo compound or salt thereof into a polarization film substrate.

DETAILED DESCRIPTION OF PREFERRED EMBODIMENTS

A in the above-mentioned formula (I) represents a naphthyl having 1 to 3 sulfos or a phenyl having 1 to 2 hydrophilic groups selected from sulfo and carboxyl and optionally having a lower alkyl or lower alkoxy. The lower alkyl or lower alkoxy is preferably a linear or branched group having 1 to 4 carbon atoms. Specific examples of the lower alkyl include methyl, ethyl, propyl and the like. Specific examples of the lower alkoxy include methoxy, ethoxy, propoxy and the like.

Examples of the phenyl represented by A include 2-, 3- or 4-sulfophenyl, 2-, 3- or 4-carboxyphenyl, 2,4- or 2,5-disulfophenyl, 3,5-dicarboxyphenyl, 2-carboxy-4- or -5-sulfophenyl, 2 - or 3-methyl-4-sulfophenyl, and the like. Among them, 4-sulfophenyl is preferable.

Examples of the naphthyl represented by A include 5-, 6-, 7- or 8-sulfo-2-naphthyl, 4-, 5-, 6- or 7-sulfo-1-naphthyl, 1,5-, 6,8-, 4,8-, 5,7- or 3,6-disulfo-2-naphthyl, 3,6- or 4,6-disulfo-1-naphthyl, and 1,5,7-, 3,6,8- or 4,6,8-trisulfo-2-naphthyl and the like. Among them, naphthyls having 2 to 3 sulfos are preferable, and disulfo-2-naphthyls such as 1,5-, 6,8-, 4,8-, 5,7- or 3,6-disulfo-2-naphthyl and the like are particularly preferable.

$R^1$ to $R^6$, which are the same as or different from each other, represent hydrogen, lower alkyl or lower alkoxy, provided that, when n represents , $R^1$ to $R^4$ represent hydrogen or lower alkyl, and do not represent a lower alkoxy. As the lower alkyl and lower alkoxy, linear or branched groups having 1 to 4 carbon atoms are preferable. As specific examples of the lower alkyl, methyl, ethyl. propyl and the like are listed. As specific examples of the lower alkoxy, methoxy, ethoxy, propoxy and the like are listed.

$R^1$ to $R^6$ preferably represent hydrogen or methyl.

$R^7$ represents hydrogen or sulfo, and preferably hydrogen.

E represents a phenyl optionally having 1 to 3 groups selected from hydroxyl, amino, nitro, sulfo, carboxyl, lower alkyl and lower alkoxy. Examples of the lower alkyl and lower alkoxy include those exemplified as the substituent of the phenyl represented by A. E preferably represents 4-hydroxyphenyl or 4-aminophenyl.

A polyazo compound of the formula (I) wherein n represents 0 and B represents —NHCO— or a salt thereof can be produced, for example, by methods described below.

First, an amide compound of the following formula (II):

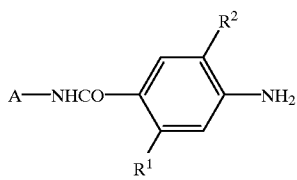
(II)

wherein, A, $R^1$ and $R^2$ are as defined above, is diazotized by reacting with sodium nitrite in an acidic aqueous medium under a condition of 5 to 40° C. The resulted diazotized compound is reacted with an aniline compound of the following formula (III):

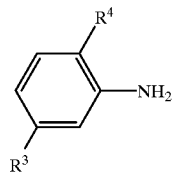
(III)

wherein, $R^3$ and $R^4$ are as defined above, in an aqueous medium under conditions of 5 to 40° C. and pH from 6 to 11, to obtain a monoazo compound. The resulted monoazo compound is diazotized by reacting with sodium nitrite in an acidic aqueous medium under a condition of 5 to 40° C. The resulted second diazotized compound is reacted with a hydroxynaphthalene compound of the following formula (IV):

(IV)

wherein, $R^7$ D and E are as defined above, in an aqueous medium under conditions of 5 to 40° C. and pH from 6 to 11, to obtain an azo compound of the formula (I).

Examples of an azo compound of the formula (I) wherein n represents 0 and B represents —NHCO— include

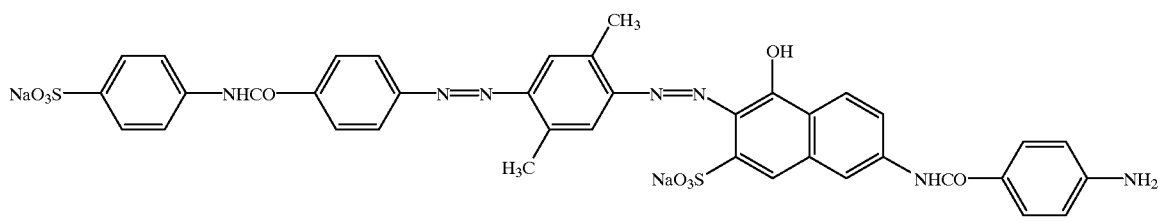
(1)

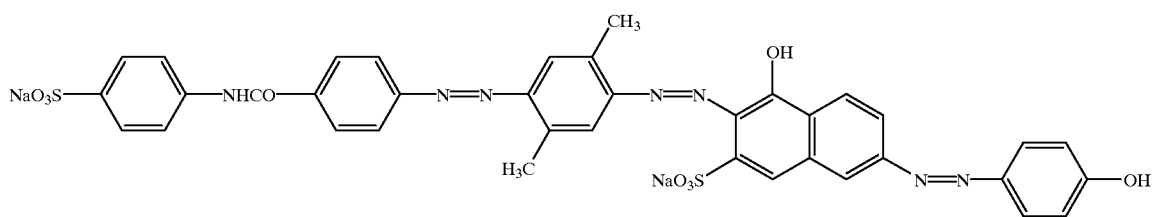
(2)

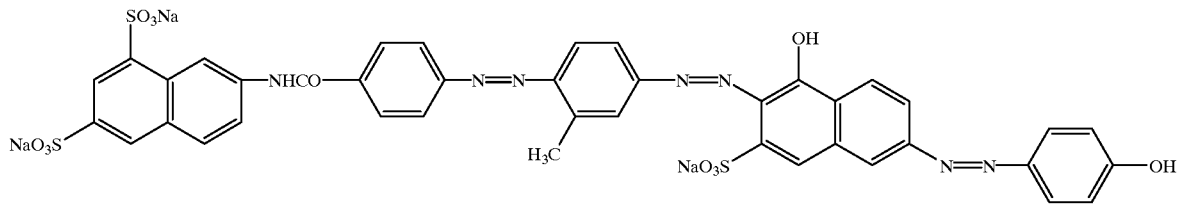
(3)

(4)

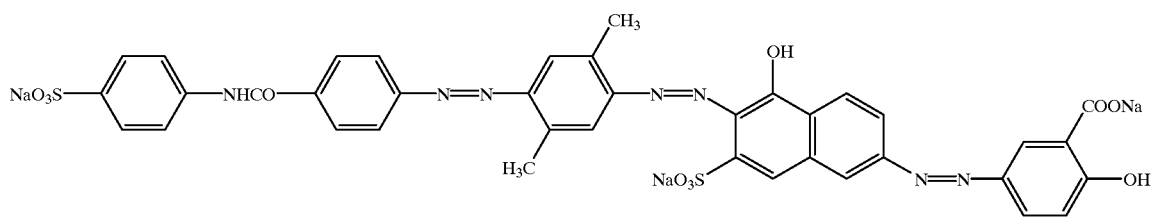

and the like.

A polyazo compound of the formula (I) wherein n represents 0 and B represents —N=N— or a salt thereof can be produced, for exampler by a method described below.

First, a disazo compound of the following formula (V):

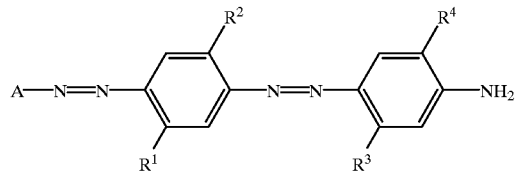

(V)

wherein, A, $R^1$, $R^2$, $R^3$ and $R^4$ are as defined above, is diazotized by reacting with sodium nitrite in an acidic aqueous medium under a condition of 5 to 40° C. The resulted diazotized compound is reacted with a naphthol compound of the formula (TV) wherein D represents —N=N— in an aqueous medium under conditions of 5 to 40° C. and pH from 6 to 11, to obtain a polyazo compound of the formula (I) or salt thereof.

Examples of a polyazo compound of the formula (I) wherein n represents 0 and B represents —N=N— include (5)

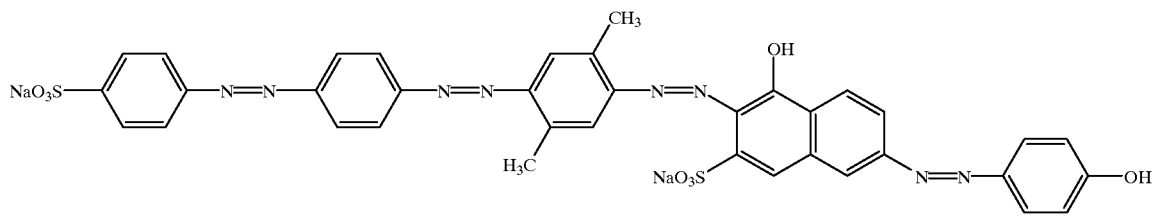

(6)

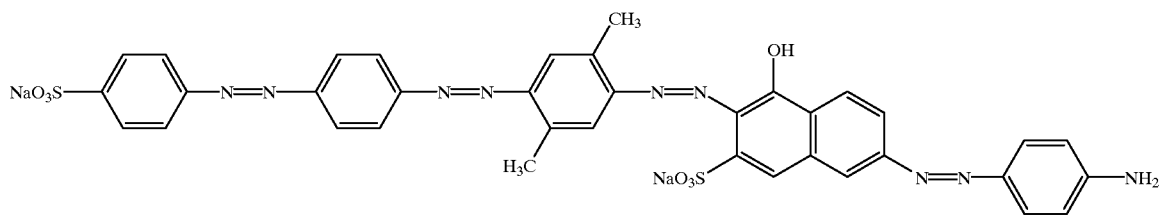

(7)

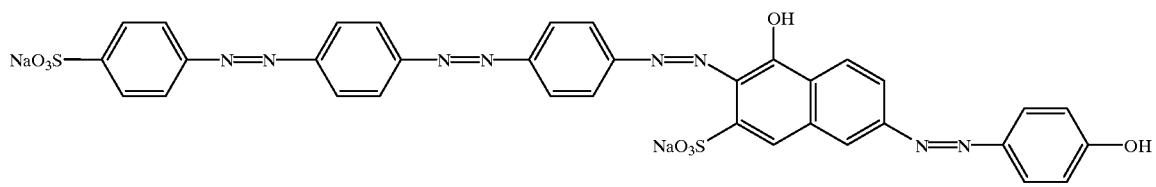

-continued
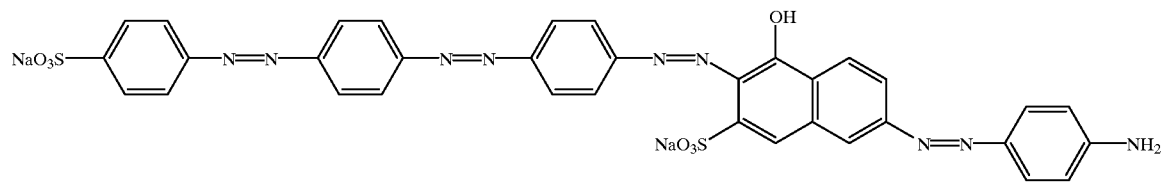
(8)
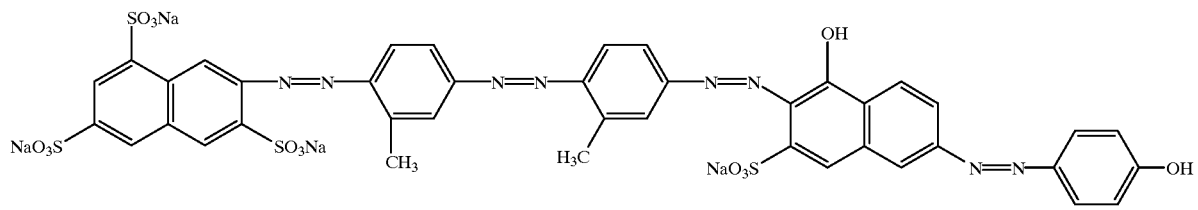
(9)
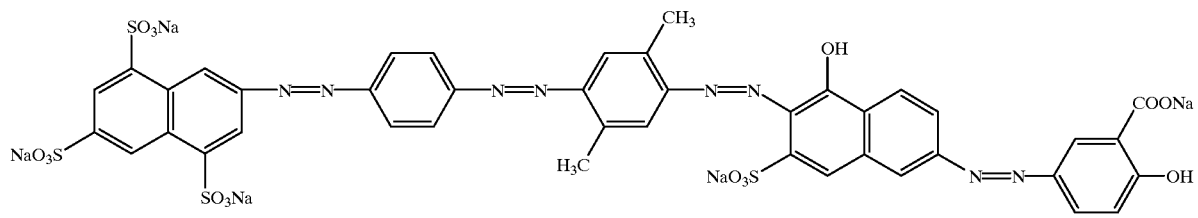
(10)
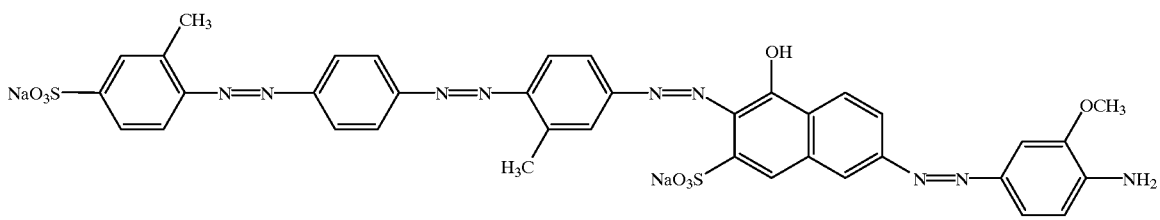
(11)
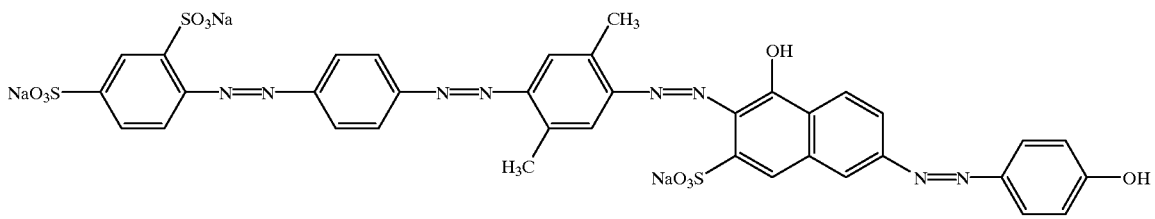
(12)

and the like.

A polyazo compound of the formula (I) wherein n represents 1 and B represents —NHCO— or a salt thereof can be produced, for example, by a method described below.

First, a disazo compound of the following formula (VI):

(VI)
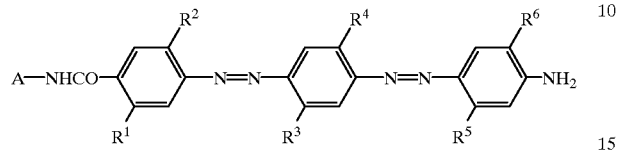

wherein, A and $R^1$ to $R^6$ are as defined above, is diazotized with sodium nitrite in an acidic aqueous medium under a condition of 5 to 40° C. Then, the resulted diazotized compound is reacted with a naphthol compound of the above-described formula (IV) in an aqueous medium under conditions of 5 to 40° C. and pH from 6 to 11, to obtain a polyazo compound of the formula (I) or a salt thereof.

As the compound of the formula (IV), compounds of the following formula (VII) or (VIII)

(VII)
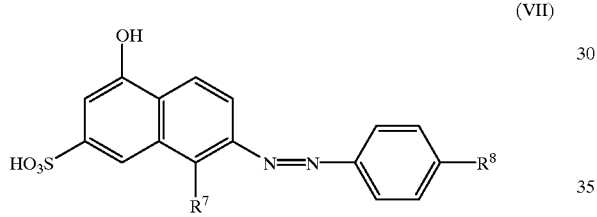

(VIII)
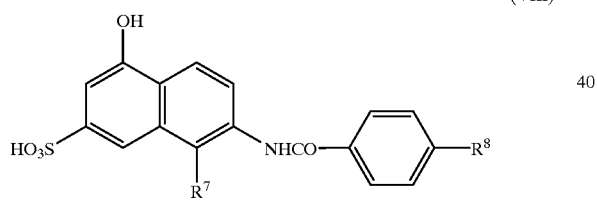

wherein, $R^7$ has the above-mentioned meaning, and $R^8$ represents hydrogen, amino or hydroxyl, are preferable.

Specific examples of a compound of the formula (IV) include

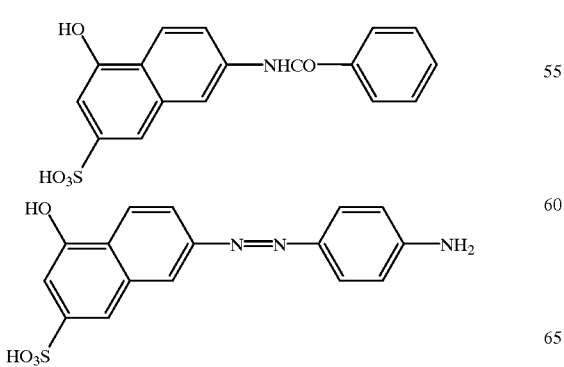

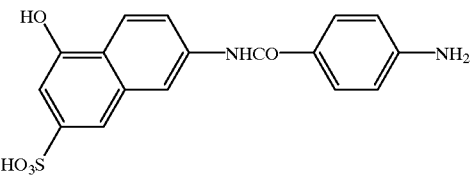

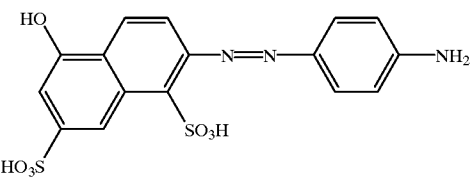

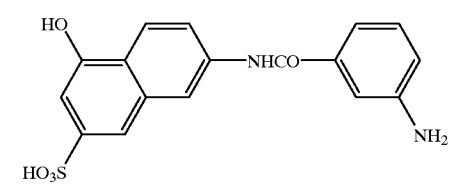

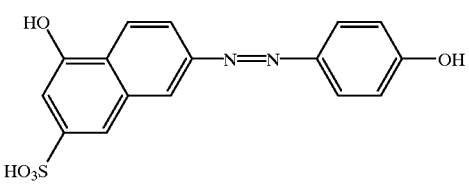

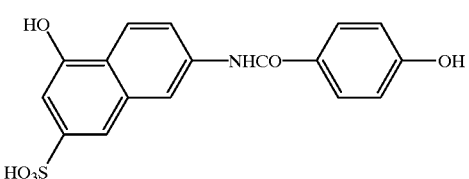

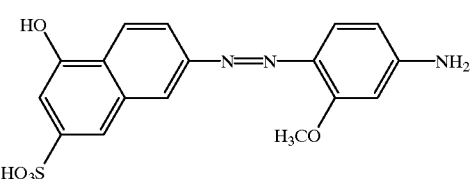

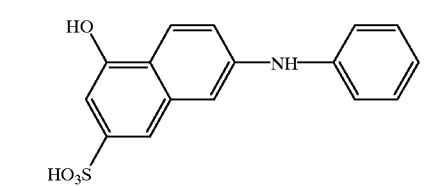

and the like.

Examples of a polyazo compound of the formula (I) wherein n represents 1, namely B represents —NHCO— include

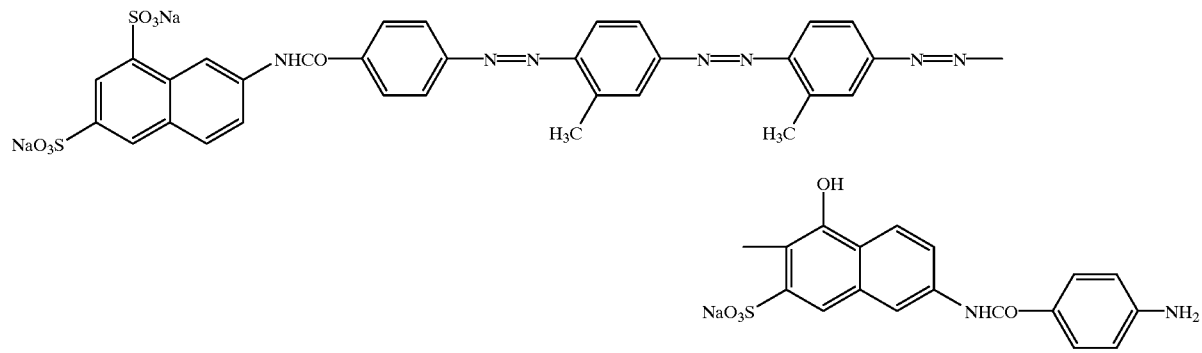
(13)
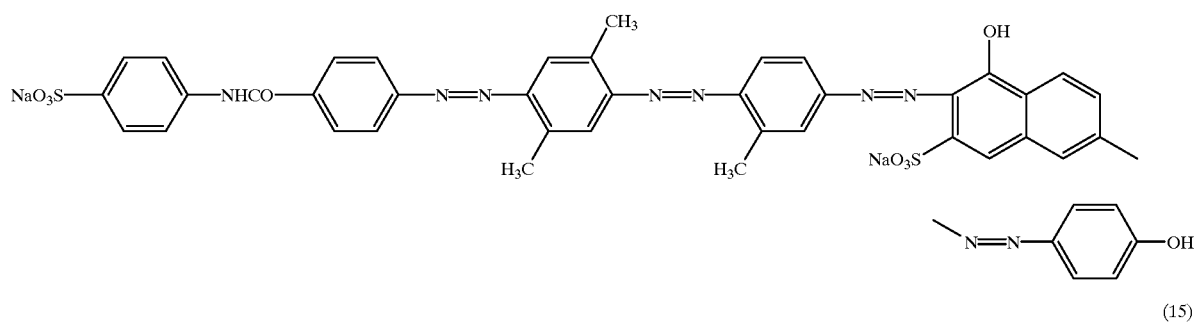
(14)
(15)
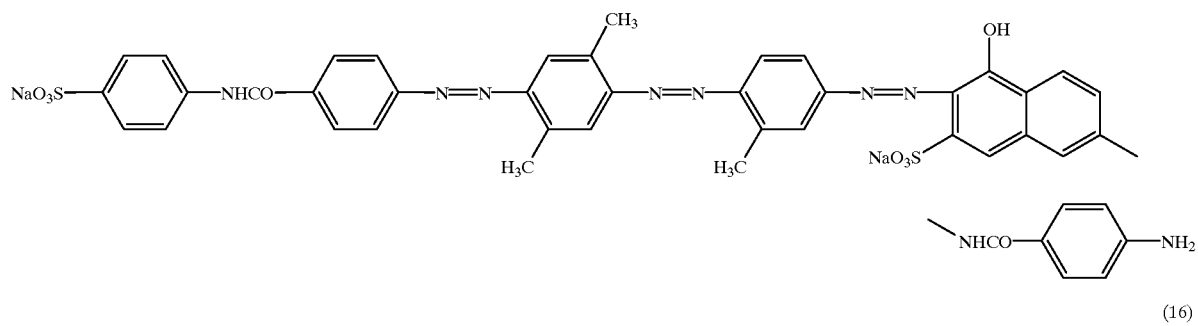
(16)
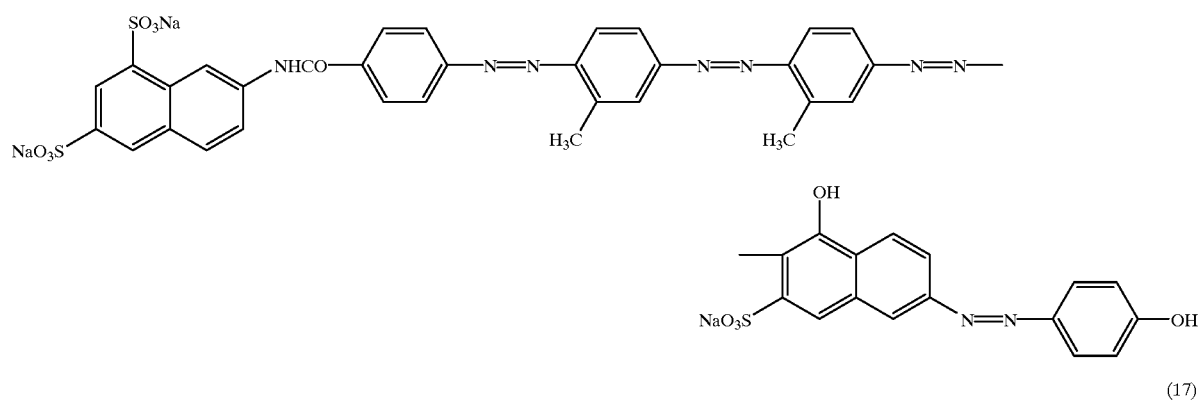
(17)
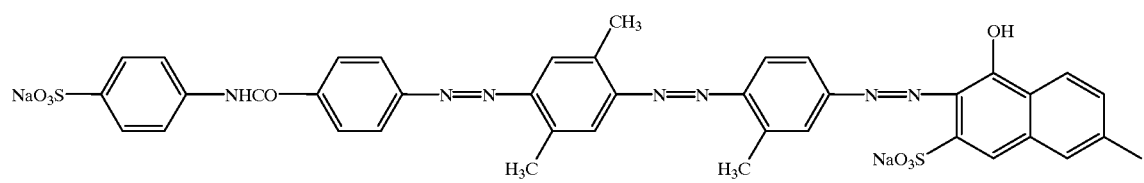

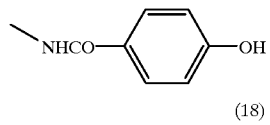

(18)

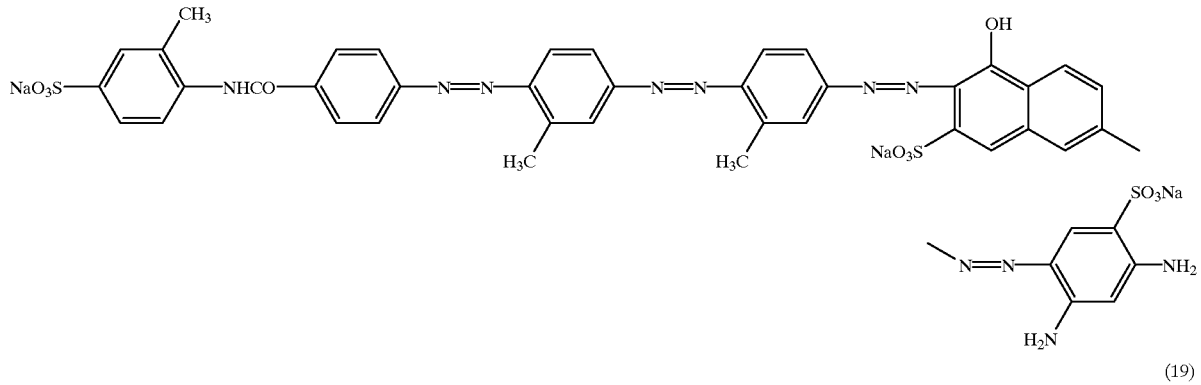

(19)

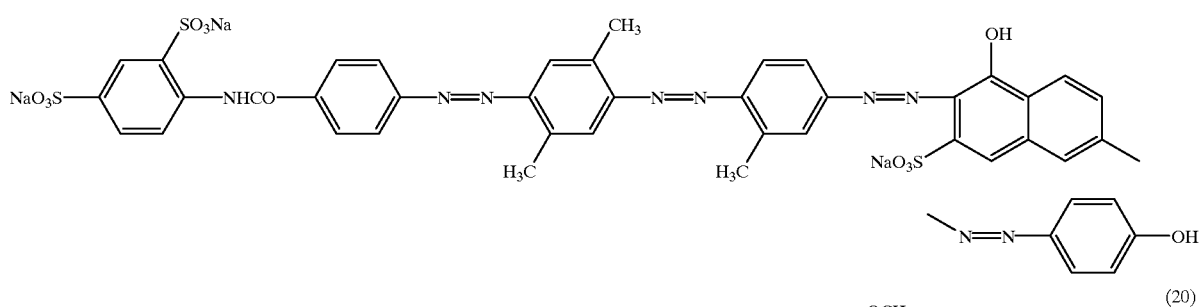

(20)

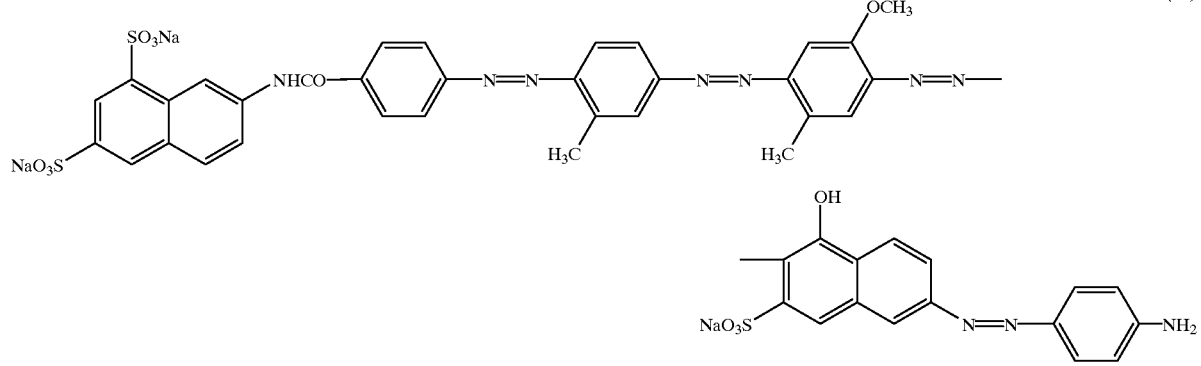

and the like.

As examples of the salt of a polyazo compound (I), alkali metal salts such as a lithium salt, sodium salt and potassium salt, an ammonium salt, and organic amine salts such as an ethanolamine salt and alkylamine salt, and the like are listed, When a polyazo compound of the formula (I) is added into a polarization film substrate, a compound in the form of a sodium salt is preferably used.

When a polyazo compound of the formula (I) or salt thereof is added into a polarization film substrate to give a polarization film, hue can be modified and polarization ability can be improved by combination with another organic dye. As the organic dye used in this case, any dye can be used as long as it has high dichroism. A polarization film suitably used in a liquid crystal projector can be produced, using a dye excellent in light resistance.

Specific examples of such organic dyes include the following compounds expressed by Color Index Generic Name.

C. I. Direct Yellow 12
C. I. Direct Yellow 28
C. I. Direct Yellow 44
C. I. Direct Orange 26
C. I. Direct Orange 39
C. I. Direct Orange 107
C. I. Direct Red 2
C. I. Direct Red 31
C. I. Direct Red 79
C. I. Direct Red 81
C. I. Direct Red 247

The dye-based polarization film of the present invention can be produced by adding a dichromatic dye comprising a polyazo compound of the formula (I) or a salt thereof or a dichromatic dye further comprising other organic dye, into a polymer film, polarization film substrate, by a known method. Examples of this polymer film include polymer films made of polyvinyl alcohol-based resins, polyvinyl acetate resins, ethylene/vinyl acetate (EVA) resins, nylon resin, polyester resins or the like Examples of the polyvinyl alcohol-based resin herein referred to include a partial or complete saponified polyvinyl acetate, that is polyvinyl alcohol; saponified substances of copolymers of vinyl acetate with other copolymerizable monomers, for example, olefins such as ethylene and propylene, unsaturated carboxylic acids such as crotonic acid, acrylic acid, methacrylic acid and maleic acid, unsaturated sulfonic acids, vinyl ethers, and the like, such as saponified EVA resins; polyvinyl formal and polyvinyl acetal obtained by denaturing polyvinyl alcohol with an aldehyde, and the like. As the polarization film substrate, polyvinyl alcohol-based films, particularly, a polyvinyl alcohol film is suitably used from the standpoints of adsorbing property and orientation property of a dye.

For adding a dichromatic dye into such a polymer film, a method of dyeing a polymer film is usually adopted. Dyeing can be effected, for example, according to the following method. First, a dichromatic dye is dissolved in water to prepare a dye bath. The concentration of a dye in the dye bath is not particularly restricted, but usually selected in the range from 0.0001 to 10% by weight. If necessary, a dyeing aid may be used. For example, it is suitable to use sodium sulfate in an amount of 0.1 to 10% by weight in a dye bath. A polymer film is immersed into the dye bath thus prepared, and dyeing is effected. The dyeing temperature is preferably from 40 to 80° C. Orientation of a dichromatic dye is conducted by stretching a polymer film. As the stretching method, any method such as a wet method, dry method and the like may be adopted, for example. Stretching of a polymer film may be conducted before dyeing or after dyeing.

A polymer film obtained by adding and orientating a dichromatic dye is subjected, if necessary to a post treatment such as boric acid treatment and the like according to a known method. Such a post treatment is effected for improving light transmittance, degree of polarization and endurance of a polarization film. Though conditions of the boric acid treatment differ depending on the kind of a polymer film used and the kind of a dye used, the boric acid treatment is generally effected using a boric acid aqueous solution having a concentration of from 1 to 15% by weight, preferably from 5 to 10% by weight at a temperature ranging from 30 to 80° C., preferably from 50 to 80° C. Further, if necessary, a fix treatment may be together conducted using an aqueous solution containing a cationic polymer compound.

A protective film excellent in optical transparency and mechanical strength can be pasted on one surface or both surfaces of thus obtained dye-based polarization film, to give a polarization plate. The material forming a protective film may be which conventionally used. For example, films composed of a fluorine resin such as an ethylene tetrafluoride/propylene hexafluoride copolymer, polyester-based films, polyolefin-based films, polyamide-based films and the like may be used, in addition to cellulose acetate-based films and acrylic films.

The following examples illustrate the present invention further in detail, but should not be construed to restrict the scope of the invention at all. "%" and "parts" in the examples are by weight unless otherwise stated.

EXAMPLE 1

160 parts of sodium 4-(4-aminobenzoylamino) benzenesulfonate and 75 parts of sodium nitrite were added to 1600 parts of water. Then, 100 parts of 35% hydrochloric acid was added to this and the mixture was stirred for 2 hours at room temperature to obtain a diazo compound a.

Separately, 120 parts of N-sulfomethyl-2,5-xylydine and 140 parts of sodium bicarbonate were added to 500 parts of water and the mixture was stirred at room temperature. The diazo compound a obtained above was charged into the resulted mixture over 1 hour, and the mixture was further stirred for 1 hour for effecting a coupling reaction. Then, a sulfomethyl group was hydrolyzed under an alkaline condition established by sodium hydroxide, to obtain a monoazo compound.

280 parts of the monoazo compound and 83 parts of sodium nitrite were added to 2800 parts of water. Then, 220 parts of 35% hydrochloric acid was added to this and the mixture was stirred for 2 hours at room temperature, to obtain a reaction mixture containing a diazo compound b.

Separately, 270 parts of a compound of the formula (21):

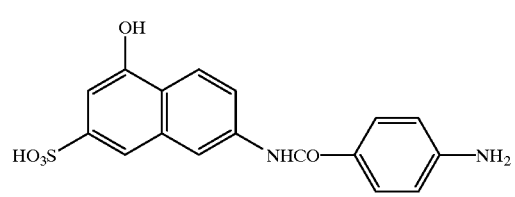

and 150 parts of sodium bicarbonate were added to a mixed solution of 1400 parts of water and 1400 parts of N-methyl-2-pyrrolidinone, and the resulted mixture was stirred at room temperature. To this mixture was added over 1 hour the reaction solution of a diazo compound b obtained above. After completion of the addition, a coupling reaction was further conducted for 1 hour, to obtain a salt of a disazo compound of the formula (1). λmax of this salt revealed 535 nm in an aqueous medium.

EXAMPLE 2

A solution of a disazo compound b was obtained according to the same manner as in Example 1.

Next, a mixture of sodium bicarbonate, water and N-methyl-2-pyrrolidinone was obtained according to the same manner as in Example 1 except that a compound of the following formula (22):

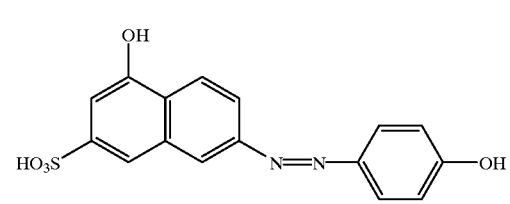

was used instead of a compound (21). To this mixture was added the solution of a disazo compound b obtained in the same manner as in Example 1. After completion of the addition, a coupling reaction was further conducted, to obtain a salt of a trisazo compound of the above formula (2). λmax of this salt revealed 560 nm in an aqueous medium.

EXAMPLE 3

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate. This polyvinyl alcohol film was kept under strained condition and immersed in an aqueous solution containing a salt of a disazo compound of the formula (1) obtained in Example 1 in a concentration of 0.025% and sodium sulfate, a dyeing aid in a concentration of 0.2% at 70° C. Then, the film was immersed in a 7.5% boric acid aqueous solution at 78° C. for 5 minutes. The resulted film was removed from the solution and washed with water at 20° C. for 20 seconds, followed by drying at 50° C. to obtain a polarization film. This polarization film had a λmax (wavelength at which transmittance along stretching direction of a film is minimum, the same in the following.) of 550 nm, had high degree of polarization, and manifested durability over a long time even under conditions of high temperature and high humidity. The film was excellent also in light resistance to exposure for a long period of time.

EXAMPLE 4

A polarization film was obtained in the same manner as in Example 3 except that the trisazo compound salt of the formula (2) obtained in Example 2 was used instead of the disazo compound salt of the formula (1) obtained in Example 1. The resulted polarization film had a λmax of 550 nm. This polarization film had high degree of polarization, and manifested durability over a long time even under conditions of high temperature and high humidity. The film was excellent also in light resistance to exposure for a long period of time.

EXAMPLE 5

40 parts of a disazo compound of the formula (23):

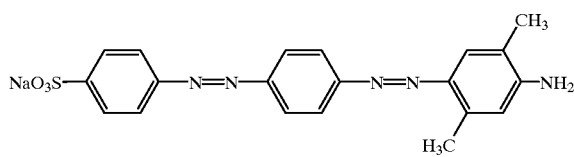

(23)

and 14 parts of sodium nitrite were added to a mixed solution of 600 parts of water and 600 parts of N-methylpyrrolidone. To this was added 72 parts of 35% hydrochloric acid while stirring at room temperature, and a diazotization reaction was conducted for 2 hours to obtain a reaction solution of the corresponding diazo compound.

Separately, 28 parts of a naphthol compound of the following formula (24):

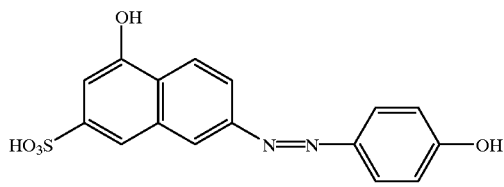

(24)

was added to a mixed solution of 600 parts of water and 100 parts of Nmethylpyrrolidone, and pH of the mixture was adjusted to 7.5 at room temperature. Then, to this was added dropwise the reaction solution of the diazo compound obtained above over 2 hours while stirring. The resulted mixture was heated to 40° C. and stirred for 2 hours at the same temperature to obtain a salt of a tetrakisazo compound of the formula (5). This salt manifested a λmax of 560 nm in an aqueous medium.

EXAMPLE 6

A salt of a tetrakisazo compound of the formula (2) was obtained in the same manner as in Example 5 except that a naphthol compound of the following formula (25):

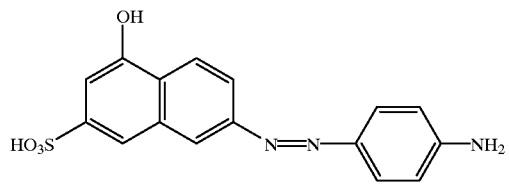

(25)

was used instead of a compound of the formula (24). This salt manifested a λmax of 572 nm in an aqueous medium.

EXAMPLE 7

A salt of a tetrakisazo compound of the formula (7) was obtained in the same manner as in Example 5 except that a disazo compound of the following formula (26):

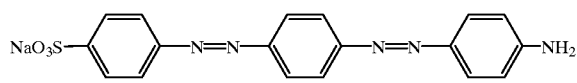

(26)

was used instead of a disazo compound of the formula (23). This salt manifested a λmax of 544 nm in an aqueous medium.

EXAMPLE 8

A salt of a tetrakisazo compound of the formula (8) was obtained in the same manner as in Example 5 except that the above-mentioned compound (26) was used instead of a disazo compound of the formula (23) and the above-mentioned compound (25) was used instead of a naphthol compound of the formula (24) This salt manifested a λmax of 556 nm in an aqueous medium.

EXAMPLE 9

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate. This polyvinyl alcohol film was kept under strained condition and immersed in an aqueous solution containing a salt of a tetrakisazo compound of the formula (5) obtained in Example 5 in a concentration of 0.025% and sodium sulfate (dyeing aid) in a concentration of 2% at 70° C., the pH of the aqueous solution being adjusted to 11. Then, the film was immersed in a 7.5% boric acidaqueous solution at 78° C. for five minutes. The resulted polyvinyl alcohol film was removed from the solution, washed with water at 20° C. for 20 seconds, and dried at 50° C. to obtain a polarization film. This polarization film had a λmax of 570 nm, had high degree of polarization, and manifested durability over a long time even under conditions of high temperature and high humidity. The film was excellent also in light resistance to exposure for a long period of time.

EXAMPLE 10

A polarization film was obtained according to the same manner as in Example 9 except that the temperature of dye bath was changed to 65° C. and the temperature of boric acid treatment was changed to 73° C. The resulted polarization film had a λmax of 570 nm. This polarization film had high degree of polarization, and manifested durability over a long time even under conditions of high temperature and high humidity. The film was excellent also in light resistance to exposure for a long period of time.

EXAMPLE 11

A polarization film was obtained according to the same manner as in Example 5 except that a tetrakisazo compound salt of the formula (6) was used instead of a tetrakisazo compound salt of the formula (5). The resulted polarization film had a λmax of 580 nm. This polarization film had high degree of polarization, and manifested durability over a long time even under conditions of high temperature and high humidity. The film was excellent also in light resistance to exposure for a long period of time.

EXAMPLE 12

A polarization film was obtained according to the same manner as in Example 9 except that a salt of tetrakisazo compound described in the following Table 1 was used instead of a tetrakisazo compound salt of the formula (5), the concentration of sodium sulfate was changed from 2% to 0.2%, and pH control was omitted, The resulted polarization film had a λmax as described in Table 1. This polarization film had high degree of polarization, and manifested durability over a long time even under conditions of high temperature and high humidity. The film was excellent also in light resistance to exposure for a long period of time.

TABLE 1

| Salt of tetrakisazo compound | λ max |
| --- | --- |
| Salt of compound of the formula (5) | 570 nm |
| Salt of compound of the formula (6) | 580 nm |
| Salt of compound of the formula (7) | 540 nm |
| Salt of compound of the formula (8) | 560 nm |

EXAMPLE 13

A polarization film was obtained according to the same manner as in Example 9 except that a dye containing a tetrakisazo compound salt of the formula (5) and C. I. Direct Orange 39 at concentrations of 0.025% and 0.005% respectively was used, the concentration of sodium sulfate was changed to 0.2%, and pH control was omitted. The resulted polarization film had a λmax of 570 nm. This polarization film had high degree of polarization, and manifested durability over a long time even under conditions of high temperature and high humidity. The film was excellent also in light resistance to exposure for a long period of time.

EXAMPLE 14

146 parts of monopotassium 7-amino-1,3-naphthalene disulfonate was added to 310 parts of water, and pH was adjusted to 7 with a 28% sodium hydroxide solution. This solution was heated to 80° C., and 79 parts of 4-nitrobenzoyl chloride was added gradually at the same temperature, During this operation, pH was maintained at 7 with a 28% sodium hydroxide solution. Then, the mixture was kept at the same temperature for 1 hour to obtain a nitro compound. A nitro group of this nitro compound was reduced to an amino group with an iron powder, to obtain a corresponding amide compound.

135 parts of the amide compound thus obtained and 25 parts of sodium nitrite were added to 660 parts of water. to this a was added 100 parts of 35% hydrochloric acid at room temperature, and the mixture was stirred for hours to convert the amino group to a diazonium salt, giving are action solution of a diazo compound d.

Separately, 75 parts of N-sulfomethyl-m-toluidine(i) and 107 parts of sodium bicarbonate were added to 940 parts of water and the mixture was stirred at room temperature. Into the resulted mixed solution was charged over 1 hour the reaction solution of a diazo compound d, and the mixture was further stirred for 1 hour to effect a coupling reaction. Then, a sulfomethyl group was hydrolyzed to be converted to an amino group under an alkaline condition attained with sodium hydroxide, to obtain a monoazo compound of the following formula (27).

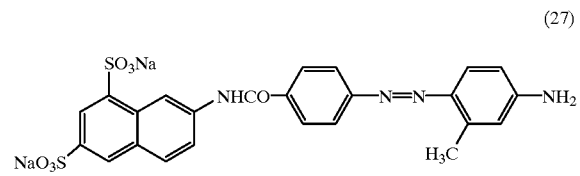

(27)

This monoazo compound was reacted with sodium nitrite under an acidic condition attained with hydrochloric acid, to obtain a reaction solution of a diazo compound c. To the reaction solution of a diazo compound c was added N-sulfomethyl-m-toluidine (ii) and a coupling reaction was conducted in the same manner as described above. The resulted reaction solution was made alkaline with sodium hydroxide, and a sulfomethyl group was hydrolyzed, to obtain a bisazo compound of the following formula (28).

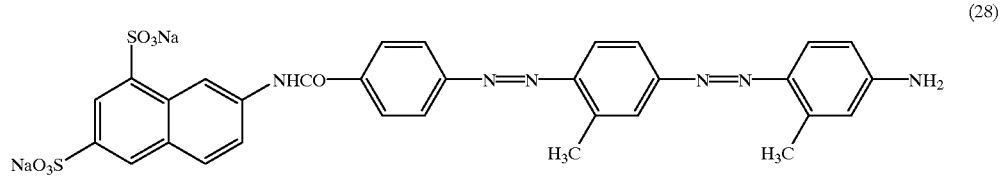

(28)

Then, 54 parts of the bisazo compound of the formula (28) was reacted with sodium nitrite under an acidic condition attained with hydrochloric acid, to obtain a reaction solution of diazo compound e.

Separately, 29 parts of a compound of the formula (29):

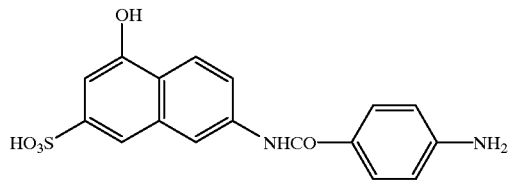

(29)

and 23 parts of sodium bicarbonate were added to a mixed solution of 150 parts of water and 150 parts of N-methylpyrrolidinone to give a solution of a sodium salt thereof. To this solution was added dropwise the reaction solution of a diazo compound e obtained previously for 2 hours, while stirring this solution. After addition, the mixture was stirred for 2 hours to obtain a salt of trisazo compound of the formula (13). This salt had a λmax of 539 nm in an aqueous medium.

EXAMPLE 15

A salt of a polyazo compound of the formula (14) was obtained according to the same manner as in Example 14 except that sulfanilic acid was used instead of monopotassium 7-amino-1,3-naphthalenesidulfonate, N-sulfomethyl-2,5-xylydine was used instead of N-sulfomethyl-m-toluidine (i) and a monoazo compound of the following formula (30):

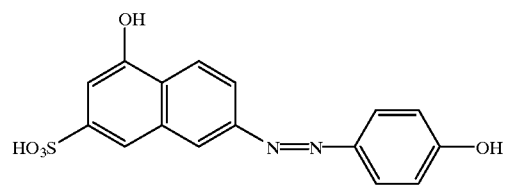

(30)

was used instead of a compound of the formula (29). This salt manifested a λmax of 558 nm in an aqueous medium

EXAMPLE 16

A salt of a polyazo compound of the formula (15) was obtained according to the same manner as in Example 14 except that sulfanilic acid was used instead of monopotassium 7-amino-1,3-naphthalenedisulfonate and N-sulfomethyl-2,5-xylydine was used instead of N-sulfomethyl-m-toluidine (i). This salt manifested a λmax of 539 nm in an aqueous medium.

EXAMPLE 17

A salt of a polyazo compound of the formula (16) was obtained according to the same manner as in Example 14 except that a compound of the formula (30) was used instead of a compound of the formula (29). This salt manifested a λmax of 550 nm in an aqueous medium.

EXAMPLE 18

A salt of a polyazo compound of the formula (17) was obtained according to the same manner as in Example 14 except that sulfanilic acid was used instead of monopotassium 7-amino-1,3-naphthalenedisulfonate, N-sulfomethyl-2,5-xylydine was used instead of N-sulfomethyl-m-toluidine and a compound of the following formula (31):

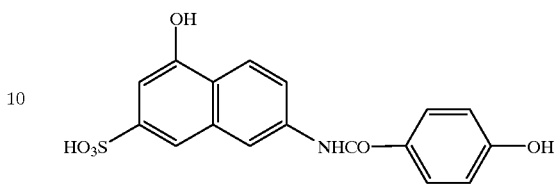

(31)

was used instead of a compound of the formula (29). This salt manifested a λmax of 537 am in an aqueous medium.

EXAMPLE 19

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate. This polyvinyl alcohol film was kept under strained condition and immersed in an aqueous solution containing a salt of a trisazo compound of the formula (13) obtained in Example 14 in a concentration of 0.025% and sodium sulfate (dyeing aid) in a concentration of 0.2% at 70° C. Then, the film was immersed in a 745% boric acid aqueous solution at 78° C. for 5 minutes. The resulted film was removed from the solution, washed with water of 20° C. for 20 seconds, and dried at 50° C. to obtain a polarization film. This polarization film had a λmax of 550 nm, had high degree of polarization, and manifested durability over a long time even under conditions of high temperature and high humidity. The film was excellent also in light resistance to exposure for a long period of time.

EXAMPLE 20

A polarization film was obtained according to the same manner as in Example 19 except that the temperature of a dye bath was changed to 65° C. and the temperature of boric acid treatment was changed to 73° C. The resulted polarization film had a λmax of 550 nm. This polarization film had high degree of polarization, and manifested durability over a long time even under conditions of high temperature and high humidity. The film was excellent also in light resistance to exposure for a long period of time.

EXAMPLE 21

A polyvinyl alcohol film [Kuraray Vinylon #7500, manufactured by Kuraray Co., Ltd.] having a thickness of 75 μm was drawn along a longitudinal axis at a magnification ratio of 5, to give a polarization film substrate. This polyvinyl alcohol film was kept under strained condition and immersed in an aqueous solution containing a salt of a polyazo compound of the formula (14) obtained in Example 15 in a concentration of 0.025% and sodium sulfate (dyeing aid) in a concentration of 0.2% at 70° C., pH of the solution being adjusted to 11. Then, the film was immersed in a 7.5% boric acid aqueous solution of 78° C. for 5 minutes, The resulted film was removed from the solution and washed with water of 20° C. for 20 seconds, and dried at 50° C. to obtain a polarization film. This polarization film had a λmax of 560 nm, had high degree of polarization, and manifested durability over a long time under conditions of high temperature and high humidity. The film was excellent also in light resistance to exposure for a long period of time.

EXAMPLE 22

A polarization film was obtained according to the same manner as in Example 21 except that the salt of polyazo compound was changed to a salt of polyazo compound described in the following Table 2 The resulted polarization film had a λmax as described in Table 2. This polarization film had high degree of polarization, and manifested durability over a long time even under conditions of high temperature and high humidity. The film was excellent also in light resistance to exposure for a long period of time.

TABLE 2

| Salt of polyazo compound | λ max |
|---|---|
| Salt of compound of the formula (14) | 560 nm |
| Salt of compound of the formula (15) | 540 nm |
| Salt of compound of the formula (16) | 550 nm |

The dye-based polarization film containing a polyazo compound or a salt thereof according to the present invention manifests high polarization ability and is excellent in durability and light resistant to exposure for a long period of time. Therefore, the films is suitable for uses of various liquid crystal display bodies such as liquid projectors for green channel, and the like.

What is claimed is:

1. A polyazo compound or salt thereof of the following formula (I):

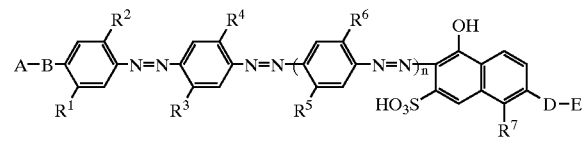

(I)

wherein,

A represents a naphthyl having 1 to 3 sulfos or a phenyl having 1 to 2 hydrophilic groups selected from sulfo and carboxyl and optionally having a lower alkyl or lower alkoxy, B represents —NHCO— or —N=N—, n represents 0 or 1, provided that, when B represents —N=N—, n represents 0, $R^1$ to $R^6$ are the same or different and represent hydrogen, lower alkyl or lower alkoxy, provided that, when n represents 0, $R^1$ to $R^4$ represent hydrogen or lower alkyl, $R^7$ represents hydrogen or sulfo, D represents —N=N— when B is —N=N— and represents —NHCO—, —N=N— or —NH— when B is —NHCO—, and E represents a phenyl optionally having 1 to 3 groups selected from hydroxyl, amino, nitro, sulfo, carboxyl, lower alkyl and lower alkoxy.

2. The polyazo compound or salt thereof according to claim 1 wherein B represents —NHCO—, and n represents 0.

3. The polyazo compound or salt thereof according to claim 1 wherein B represents —NHCO—, and n represents 1.

4. The polyazo compound or salt thereof according to claim 1 wherein B represents —N=N—.

5. The polyazo compound or salt thereof according to claim 1 wherein A represents a naphthyl having 2 to 3 sulfos or a phenyl having 1 to 2 hydrophilic groups selected from sulfo and carboxyl.

6. The polyazo compound or salt thereof according to claim 1 wherein A represents 4-sulfophenyl, 1,5-disulfo-2-naphthyl, 6,8-disulfo-2-naphthyl, 4,8-disulfo-2-naphthyl, 5,7-disulfo-2-naphthyl or 3,6-disulfo-2-naphthyl.

7. The polyazo compound or salt thereof according to claim 1 wherein $R^1$ to $R^6$ represent hydrogen or methyl.

8. The polyazo compound or salt thereof according to claim 1 wherein $R^7$ represents hydrogen.

9. The polyazo compound or salt thereof according to claim 1 wherein E represents 4-hydroxyphenyl or 4-aminophenyl.

10. A dye-based polarization film obtainable by adding the polyazo compound or salt thereof according to claim 1 into a polarization film substrate.

11. The dye-based polarization film according to claim 10 wherein the polarization film substrate is a polymer film made of a polyvinyl alcohol-based resin.

* * * * *